C. S. BONNEY.
Farm Gate.
No. 82,075.          Patented Sept. 15, 1868.
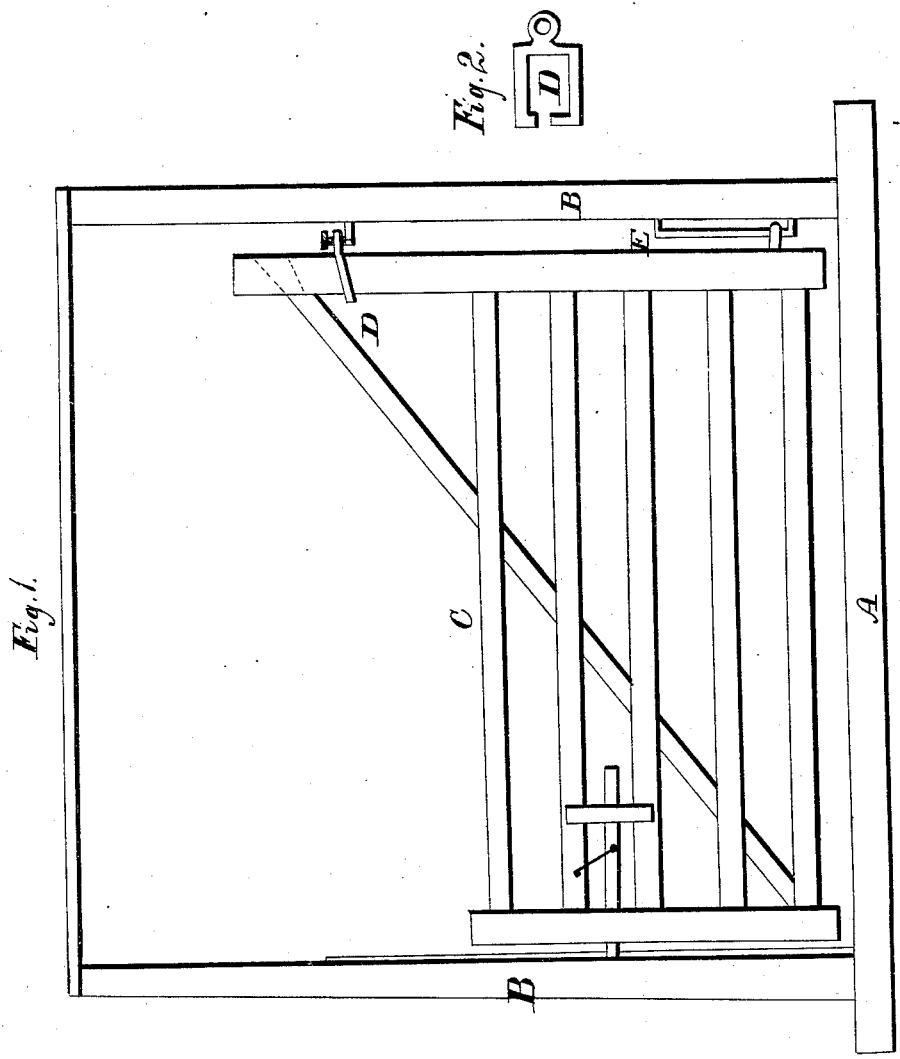
Witnesses:
Inventor:

United States Patent Office.

CHARLES S. BONNEY, OF PENN YAN, NEW YORK.

Letters Patent No. 82,075, dated September 15, 1868.

IMPROVEMENT IN FARM-GATES.

*The Schedule referred to in these Letters Patent and making part of the same.*

TO ALL WHOM IT MAY CONCERN:

Be it known that I, CHARLES S. BONNEY, of Penn Yan, in the county of Yates, and State of New York, have invented a new and useful Improvement in Farm-Gates; and I do hereby declare that the following is a full, clear, and exact description of the construction and operation of the same, reference being had to the annexed drawings, making a part of this specification, in which—

Figure 1 is a side elevation.

Figure 2 is a bird's-eye view of the upper hinge.

The letters of reference refer to the same parts in each figure.

The nature of my invention consists in making a farm-gate and its hinges, in such manner that it may be raised and lowered and held up to any required height, without any additional fixtures, for the purpose of having the gate swing over snow and ice, and to allow small animals to pass under it, and it may be readily lowered by raising the end of the upper hinge, to make it loose upon the gate.

To enable others skilled in the art to make and use my invention, I will proceed to describe its mode of construction and operation.

A is a sill, laid upon the ground or fixed into it, for the purpose of supporting the posts, B and B.

B and B are posts. They are set in the sill A, or may be set in the ground in the ordinary manner. The one at the left end, as shown in fig. 1, may have any desirable device attached to or made in it, to hold the gate shut. The right one has the hinges driven into it, as shown in the figure.

C is the gate. It may be made as represented in fig. 1, or any other manner preferred that will admit the application of the peculiar upper hinge. The stile that has the hinges applied to it may be made any length that is required, to allow the gate to be raised to any desired height.

D is a part of the upper hinge. It is made to clasp the stile of the gate. When the stile extends above or higher than the gate, as shown in fig. 1, and when it is necessary to apply it below the top of the gate, it should be made as shewn in fig. 2, so that the boards of the gate may pass through the opening. The hole for the pin of the other part of the hinge must be large enough to allow the other end to lower enough to cause it to clasp the stile of the gate firmly, when the gate is raised or lowered to the required position.

E is a part of the lower hinge. Its shape and position are shown in fig. 1. It must be made so that the other part will slide freely upon it, and must be long enough to allow the gate to be raised the required height.

Having thus fully described my invention, what I claim as new, and desire to secure by Letters Patent, is—

The hinges D and E, when made and applied as specified, and used in combination with the gate C, substantially as and for the purpose set forth.

CHARLES S. BONNEY.

Witnesses:
JOHN L. LEWIS,
CHARLES KETCHUM.